United States Patent
Nerone

[11] Patent Number: 6,144,173
[45] Date of Patent: Nov. 7, 2000

[54] SINGLE SWITCH ELECTRONIC BALLAST

[75] Inventor: Louis R. Nerone, Brecksville, Ohio

[73] Assignee: General Electric Company, Schenectady, N.Y.

[21] Appl. No.: 09/437,546

[22] Filed: Nov. 10, 1999

[51] Int. Cl.[7] .................................................. H05B 37/02
[52] U.S. Cl. ......................... 315/291; 315/224; 315/276
[58] Field of Search ........................... 315/200 R, 209 R, 315/219, 224, 247, 276, 283, 291, 307, DIG. 7

[56] References Cited

U.S. PATENT DOCUMENTS

| | | | |
|---|---|---|---|
| 4,245,178 | 1/1981 | Justice | 315/248 |
| 4,418,297 | 11/1983 | Marshall | 310/316 |
| 4,607,323 | 8/1986 | Sokal et al. | 363/97 |
| 4,716,343 | 12/1987 | Lindquist | 315/307 |
| 4,902,938 | 2/1990 | Lindquist | 315/307 |
| 5,001,399 | 3/1991 | Layden | 315/105 |
| 5,059,868 | 10/1991 | El-Hamamsy et al. | 315/248 |
| 5,065,300 | 11/1991 | Jacobson et al. | 363/16 |
| 5,151,852 | 9/1992 | Jacobson et al. | 363/131 |
| 5,179,511 | 1/1993 | Troyk et al. | 363/97 |
| 5,387,850 | 2/1995 | Bray et al. | 315/248 |
| 5,406,177 | 4/1995 | Nerone | 315/307 |
| 5,453,665 | 9/1995 | Konopka | 315/DIG. 7 |
| 5,640,313 | 6/1997 | Takehara et al. | 363/21 |
| 5,666,279 | 9/1997 | Takehara et al. | 363/95 |
| 5,680,034 | 10/1997 | Redl | 323/21 |
| 5,694,006 | 12/1997 | Konopka | 315/247 |
| 5,757,166 | 5/1998 | Sodhi | 323/222 |
| 5,798,616 | 8/1998 | Takehara et al. | 315/247 |
| 5,818,709 | 10/1998 | Takehara | 363/95 |
| 5,834,907 | 11/1998 | Takehara | 315/307 |
| 5,877,596 | 3/1999 | Allison | 315/308 |
| 5,914,570 | 6/1999 | Nerone et al. | 315/224 |
| 5,945,783 | 8/1999 | Schultz et al. | 315/219 |
| 6,008,589 | 12/1999 | Deng et al. | 315/209 R |

*Primary Examiner*—Don Wong
*Assistant Examiner*—Thuy Vinh Tran
*Attorney, Agent, or Firm*—Fay, Sharpe, Fagan, Minnich & McKee, LLP

[57] ABSTRACT

A lighting circuit (A) includes an input (10), which supplies a single switch ballast (12), which in turn powers a lamp (14). Ballast (12) is in a self-starting, self-oscillating class E converter configuration, which allows for adjustment of the switching duty ratio. Self-oscillation occurs due to the use of regenerative feedback path consisting of a first winding (36), feedback inductor (40), and charging capacitor 42. Increasing output to MOSFET switch (34) occurs once MOSFET switch (34) has been biased to an on state through inputs from input circuit (12), which have been supplied from current source (32). Adjustment of the switching ratio for MOSFET switch (34) is accomplished by selection of appropriate values for zener diodes (48, 50), wherein the voltage breakdown of the zener diode 50 is greater than zener diode 48 reduce the duty ratio to less than 50%, thereby reducing the voltage rating of the switch. Control of the switching ratio allows for switches with lower voltage ratings when driving lamp (14) in this single switching configuration.

20 Claims, 2 Drawing Sheets

SINGLE SWITCH ELECTRONIC BALLAST

FIELD OF THE INVENTION

The present invention relates to a ballast, or power supply circuit for discharge lamps. More particularly, the invention relates to a self-starting, self-oscillating single switch ballast having an adjustable duty ratio.

BACKGROUND OF THE INVENTION

Previous electronic ballast designs have commonly included two switches in order to convert a dc signal into a high-frequency ac signal used to start and operate a discharge lamp. Existing ballast designs have also generally been driven by an integrated circuit, increasing the cost and complexity of the circuit design. Other manners of starting discharge lamps include the use of resistive ballasts having glow bottle starters.

It has therefore been deemed desirable to provide an improved electronic ballast, designed as a class E inverter, which is self-starting, self-oscillating and where the duty ratio is adjustable. It would also be beneficial to have such a ballast constructed with minimal components at a low cost.

SUMMARY OF THE INVENTION

An exemplary embodiment of the invention provides a single switch ballast. The ballast includes a current source inductor connected to receive a dc voltage supplied from a voltage source in order to convert unregulated dc voltage to a current which feeds the ballast. The single switch is configured as a class E inverter, the switch is supplied with feedback voltage through a regenerative feedback path. The regenerative feedback path includes a first winding of a transformer, a feedback inductor and a charging capacitor. A starting resistor network is connected between a high side bus and a low side bus, to ensure the circuit reaches a desired voltage prior to turning on of the switch. A pair of zener diodes are provided between the switch and the low side bus, and act to control the duty ratio of the switch. A switching capacitor is connected across the switch at the drain-source and to a second winding of the transformer and a resonant capacitor. Upon start-up the charging capacitor charges up through the starting resistor network until the charging capacitor reaches a threshold value which biases the switch on. Upon turning on, the switch enters an oscillation mode until reaching a switching mode. Further provided is a current limiting resistor connected in the source of the switch such that when the switch is first turned on, current is limited, in order to avoid unnecessary stresses when power is applied.

DETAILED DESCRIPTION OF THE INVENTION

Figure 1:
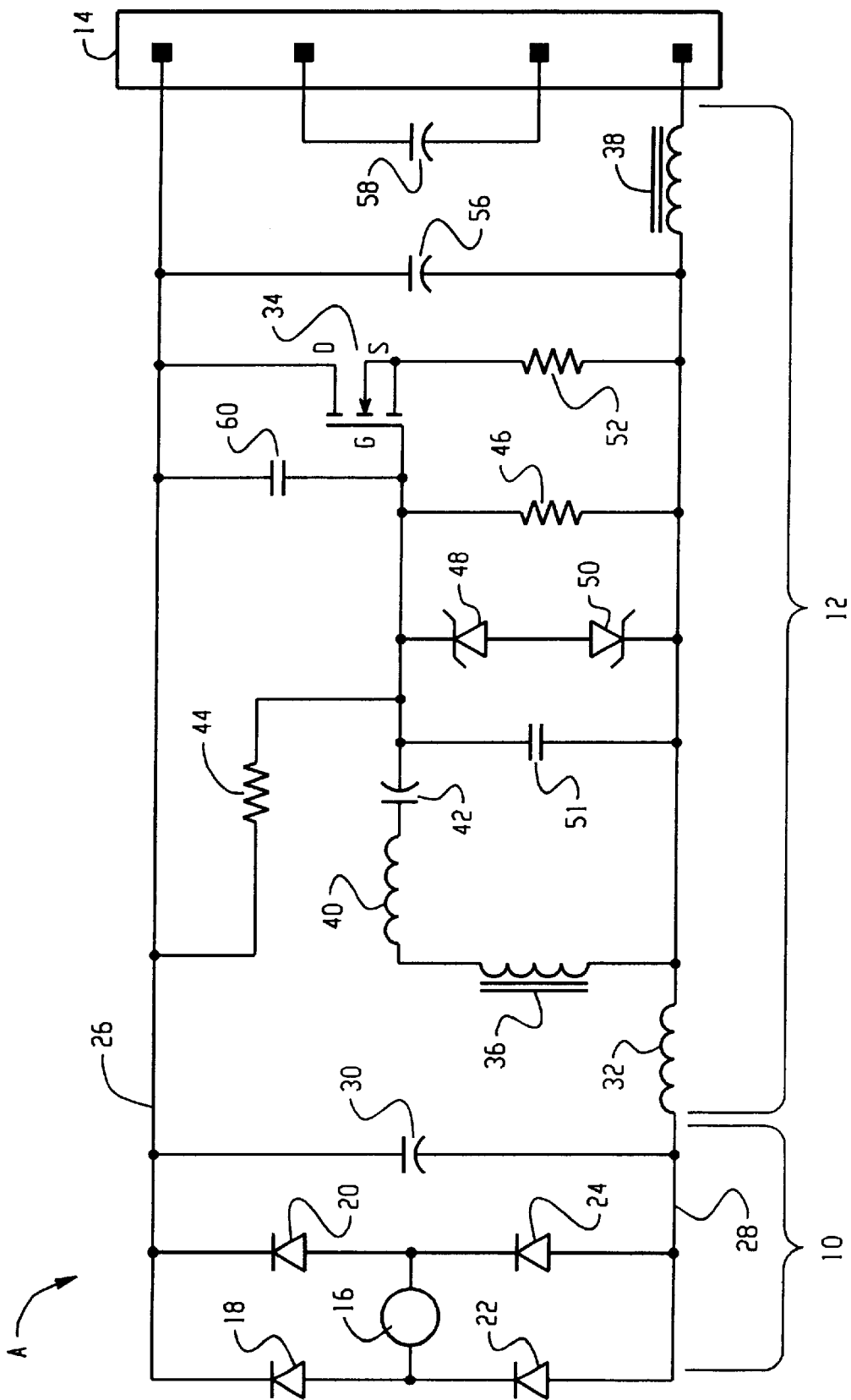
FIG. 1 is a schematic diagram of an electronic ballast incorporating the concepts of the present invention.

FIG. 1 is a lighting circuit A, having an input portion 10, supplying an electronic ballast circuit 12, which in turn powers a lamp 14. The lamp 14 is a discharge lamp, and in one embodiment is a 15 W, T8 fluorescent lamp.

Input section 10 includes an ac source 16 which supplies an ac line voltage. The ac line voltage is converted by a full-wave bridge rectifier composed of a diode bridge 18, 20, 22 and 24. The full wave bridge rectifier 18–24 is connected by positive or high dc side bus 26 and common or low side bus 28 to input capacitor 30, which provides energy storage for the low power factor conversion from the ac line voltage to dc voltage.

With attention to ballast 12, a first inductor (also called current source inductor) 32 converts the unregulated dc voltage across input capacitor 30 to a dc current that feeds the inverter section of ballast 12. Current source inductor 32 also acts as a low pass filter to reduce conducted emissions on the incoming ac line voltage. Thus, current source inductor 32 acts as a constant current source for ballast 12. A single switch 34, which may be a MOSFET, although other switching elements may be implemented, is configured as a class E common source amplifier. A transformer, consisting of a first transformer winding 36, and a second transformer winding 38, is designed such that the first transformer winding 36 is part of a regenerative feedback path further including a feedback inductor 40 and a charging capacitor 42. A starting resistor network, consisting of resistors 44 and 46, is connected as a voltage divider network between positive bus 26 and common bus 28. A pair of Zener diodes 48, 50 and a parallel capacitor 51 are provided between the input of switch 34 and common bus 28. A current limiting resistor 52 is included within the source of switch 34. Switching capacitor 56 is placed across positive bus 26 and common bus 28, to shunt switch 34, in order to obtain soft-switching. Second transformer winding (also called resonant winding) 38 along with resonant capacitor 58, form a tuned circuit connected to the terminals of lamp 14. A swamping capacitor 60 may be placed across switch 34.

Switching of class E inverters occur at optimal or suboptimal modes. The conditions of zero-switch voltage and zero dv/dt when the switch turns on are usually referred to as the optimal mode of operation. Any other operational mode is known as being sub-optimal optimal. Although zero-switch voltage is crucial to minimize switching losses, the zero dv/dt is not as critical. Some conduction through the intrinsic diode of a switch allows an inverter to endure large variations in a bus voltage and lamp arc resistance.

Figure 2:
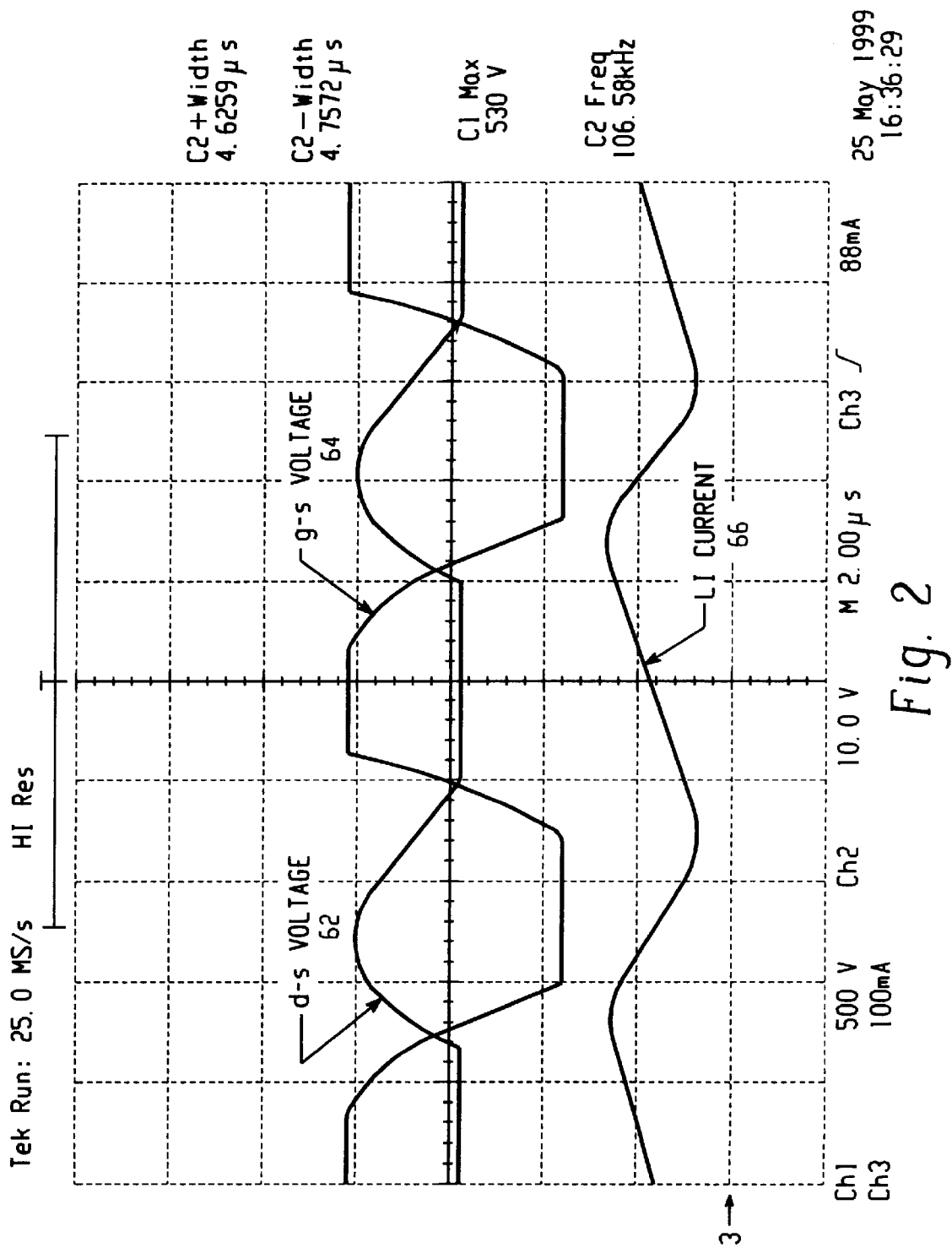
FIG. 2 illustrates circuit wave forms for the ballast shown in FIG. 1.

As shown in FIG. 2, a drain-to-source voltage appears as substantially a one-half sine wave 62. The voltage across the switch being zero when the switch is on, and rising to a peak voltage, Vpk, when the switch is off. For a Class E inverter, the average voltage, Vavg, will be equal to the bus voltage. FIG. 2 also illustrates the gate-to-source voltage waveform 64 and wave form 66, the current through source inductor 32, during operation of ballast 12.

It is also known that, for a class E inverter, there is a relationship between the duty cycle of the switch, the average voltage on the switch, and the peak voltage on the switch. With a one-half sine wave, it is therefore known that, $$Vavg = Vpk/\pi$$

wherein Vavg is the average voltage and Vpk is the peak voltage.

Further, $$Vpk = \frac{\pi \times Vavg}{2 \times (1-D)} = \frac{\pi \times Vb}{2 \times (1-D)}$$

where D is equal to the duty cycle of the switch.

Since Vavg is constant in the sense that it is equal to Vb (the bus voltage) and is therefore only a function of the input line voltage, the voltage across the switch can only be altered by changing the duty ratio of the switch. Particularly, when the duty ratio is shortened, the peak voltage across the switch will be lowered on the switch, and when the duty ratio increases the peak voltage will increase on the switch for the same average value of line voltage.

Most high-voltage power MOSFETs, suitable for operating in the class E configuration, are offered in 200V increments. Usually, a 600V switch may be purchased at a considerably lower cost than an 800V switch, given the same Rds(on). When operating a class E inverter from 120V power line with a duty ratio of 50%, it would be necessary to choose an 8000V switch to ensure safe, reliable operation. A 230V power line would require a 1200V switch.

However, if the duty cycle is lowered, thus lowering the peak voltage on the switch, smaller rated and less expensive switches may be used for operation. This is accomplished in the present invention by adjustment of the duty ratio in accordance with the circuit shown in FIG. 1 which depicts self-starting, self-oscillating ballast 12, which allows for adjustment of its duty ratio.

Switch 34 is biased on when voltage across charging capacitor 42 reaches the threshold voltage of switch 34. When power is initially applied to ballast 12, charging capacitor 42 charges through resistor 44 of resistive network 44, 46, which is used to provide attenuation to the circuit. Particularly, without resistive network 46, 48, switch 34 would be able to start at undesirably low bus voltages prior to sufficient energization of the circuit. Resistors 44 and 46 are arranged as a voltage divider having an appropriate ratio, so that voltage on positive bus 26 will reach a predetermined value prior to starting the system. In one embodiment where threshold voltage of switch 34 is 3 volts, the ratio between resistor 44 and resistor 46 is selected so that 30–40V in 120V system will be across the bus prior to starting of switch 34.

During charge-up of the system, there is no current flowing, therefore first transformer winding 36 and feedback inductor 40 are substantially shorts.

Turning on of switch 34 results in activation of switch 34, configured as a high-gain common source amplifier with regenerative feedback. Feedback current is provided through the regenerative feedback path consisting of first transformer winding 36, feedback inductor 40 and charging capacitor 42. Also added to the feedback path would be the small signal gain of switch 34.

Initially after starting, MOSFET switch 34, configured as the common source amplifier, begins oscillating at a frequency determined by feedback inductor 40 and parasitic input capacitance of switch 34. The oscillation frequency may be controlled by addition of capacitor 60 across the gate of switch 34, which acts to swamp out the variability of the parasitic component. Since the feedback current is regenerative, the amplitude of oscillations grow, causing switch 34 to operate in a switched mode. When switch 34 turns on and off, a periodic voltage is applied to the tuned circuit consisting of resonant capacitor 58 and second transformer winding 38. This voltage can be seen as 62 in FIG. 2.

Current limiting resistor 52 limits current when switch 34 first conducts and discharge capacitor 56 discharges. This current limiting feature is provided since capacitor 56 is charged to the bus voltage. When switch 34 first turns on, it has to discharge capacitor 56. If the current is not limited, damage to switch 34 could occur. Inclusion of current limiting resistor 52 means a voltage will increase across resistor 52. The current increases up to a point where switch 34 cannot be driven by the source 16. Thus, current limiting resistor 52 acts to limit the current until ballast 10 starts up, keeping switch 34 from being overstressed.

In ballast circuit 12, adjustment of the duty ratio can be obtained by adjusting selection of the voltage breakdown ratings of Zener diodes 48 and 50. More particularly, in the present embodiment a diode rated a 10 v may be used for diode 48 in order to drive the MOSFET switch 34 properly. By selecting diode 50 to be more than a 10 v diode, the duty ratio of the present invention is reduced below 50%. For example, if diode 48 is 10 v and diode 50 is 15 v, a 48% duty ratio is obtained. By lowering the duty cycle, a smaller rated switch 34 may be selected thereby providing for a more economical ballast configuration. It is to be appreciated that this design will allow a higher current through switch 34. However, the tradeoff between this higher current and the need to use a higher rated and more expensive switch has been determined to be an acceptable tradeoff in certain designs.

It is noted that resonant inductor 38 is connected to the common or low side bus 28. This design allows for a more efficient winding of transformer 36, 38, eliminating the need to provide high-voltage isolation. Current source inductor 32 is also connected to the low or common side bus 28, to allow a low impedance path connection to the high dc side bus 26 via input capacitor 30. This design reduces conducted emissions of the input and allows a smaller size and lower cost emi filter.

The gain of the regenerative loop 36, 40, 42 determines whether oscillations will increase exponentially until the system reaches the switching mode. Thus, initially switch 34 operates as in a class A mode. Then, assuming sufficient gain, the magnitude of the oscillations increase until the switch mode is reached. Self-oscillation is obtainable by the coupling of the first transformer winding 36 to the second transformer winding 38 which is used to guide the gate of switch 34. Unlike voltage fed converters, the present design is a current fed system caused by the inductor 32 and periodic switching.

For a ballast circuit 12 supplied by a 120V ac input source converted by the full-wave bridge rectifier 18–24, which stores a dc voltage on a 22 μf input capacitor 30, exemplary component values are as follows:

| | |
|---|---|
| Current Source Inductor 32 | 5.6 mh |
| MOSFET Switch 34 | MTD1N60;600 V |
| First and Second Transformer Windings 36 and 38 | 1 mH |
| Turns Ratio Between 36 and 38 | 130/6 |
| Feedback Inductor 40 | 560 μH |
| Charging Capacitor 42 | 22 nF |
| Resistor 44 | 560K |
| Resistor 46 | 56K |
| Zener Diode 48 | 10 V |
| Zener Diode 50 | 15 V |
| Current Limiting Resistor 52 | 2 ohms |
| Switching Capacitor 56 | 1.5 nF |
| Resonant Capacitor 58 | 2.2 nF |
| Swapping capacitor 60 | 2.2 nF |

Results obtained from operation of ballast 12 include measurement data of:

| | |
|---|---|
| Efficiency | 87.4% |
| Input Power | 13.76 W |
| Output (Lamp) Power | 12.04 W |

-continued

| | |
|---|---|
| Output (Lamp) Current | 250.55 mA |
| Output (Lamp) Voltage | 48.43 V |

This information was obtained for a system operated at 120V ac, powering a 15 watt T8 fluorescent lamp.

It is to be noted the described component values are simply for illustration. It is intended the switching duty ratio be adjusted by selecting values other than the 10 volts for the Zener diode 50. Other component values may also be used dependent upon input values and the ratings of lamp which is to be driven.

While the invention has been described with respect to specific embodiments by way of illustration, many modifications and changes will occur to those skilled in the art. It is therefore, to be understood that the appended claims are intended to cover all such modifications and changes as fall within the true spirit and scope of the invention.

What is claimed is:

1. A single switch electronic ballast which powers a lamp, the ballast comprising:
    a switch configured as a Class E, inverter;
    a feedback path connected to supply the switch with a regenerative feedback current, the feedback path including a first winding of a transformer, a feedback inductor, and a charging capacitor;
    a starting resistor network connected to a high side bus and a low side bus in order to receive a rectified dc voltage;
    a current source inductor connected to receive the dc voltage and to generate a dc current for powering the ballast;
    zener diodes connected between the switch and the transformer, the current source inductor;
    a blocking capacitor connected across the switch and to a second winding of the lamp, wherein upon startup the charging capacitor charges up through starting resistor network until the charging capacitor reaches a threshold value which biases switch on, and wherein upon turning on, switch oscillates until reaching a switching mode.

2. The invention according to claim 1 wherein the values selected for the diodes control a duty cycle of the switch.

3. The invention according to claim 1 wherein the ballast is a self-starting ballast.

4. The invention according to claim 1 wherein the current source inductor is selected to convert the unregulated dc voltage to a dc current that feeds the inverter.

5. The invention according to claim 1 wherein the current source inductor is configured to be used as a low pass filter, to reduce conducted emission of the input voltage.

6. The invention according to claim 1 wherein the value of the blocking capacitor is selected to shunt the switch so as to provide a soft start of the switch.

7. The invention according to claim 1 wherein a secondary winding and a lamp capacitor form a resonant network that ballasts the lamp.

8. The invention according to claim 1 further including a swamping capacitor connected across a gate of the switch, which may be selected to swamp out a parasitic capacitance of the switch.

9. The invention according to claim 1 wherein the current source inductor controls frequency of the oscillations dependent upon the value of the current source inductor.

10. The invention according to claim 1 wherein the regenerative feedback current further includes a gain current from the switch.

11. A lighting system comprising:
    an ac input source which generates an ac input voltage;
    a lamp which is to be driven;
    a full wave bridge rectifier that receives and converts the ac input voltage to a dc voltage;
    an input capacitor connected across the full bridge rectifier for storing the converted dc voltage; and
    a single switch electronic ballast connected across the input capacitor, rectifier, and the lamp in order to supply the lamp, the ballast including:
        a current source inductor connected to receive the dc voltage rectified by the full wave bridge rectifier, to convert unregulated dc voltage across input capacitor to a current that feeds the ballast,
        a switch configured as a class E inverter,
        a regenerative feedback path connected to supply the switch with a regenerative feedback current, the regenerative feedback path including a first winding of a transformer, a feedback inductor, and a charging capacitor,
        a starting resistive network connected to the charging capacitor and further connected to receive the dc voltage rectified by the full wave bridge rectifier,
        zener diodes connected between the switch, and the transformer and the current source inductor, to control the duty cycle of the switch,
        a capacitor connected across the switch, and to a second winding of the transformer, wherein upon startup, the charging capacitor charges up through the starting resistor network until the charging capacitor reaches a threshold value which biases the switch on, and wherein upon being turned on, the switch oscillates until reaching a switching mode.

12. The invention according to claim 11 wherein the current source controls the frequency of the oscillations dependent upon a value selected for the current source inductor.

13. The invention according to claim 11 wherein the regenerative feedback current further includes gain current from the switch.

14. The invention according to claim 11 wherein the oscillations of the switch are further controlled by parasitic capacitance of the switch.

15. The invention according to claim 11 further including a swamping capacitor connected across a gate of the switch, which may be selected to swamp out parasitic capacitance of the switch.

16. The invention according to claim 11 wherein the value of the blocking capacitor is selected to shunt the switch so as to provide for a soft start of the switch.

17. The invention according to claim 11 wherein secondary winding and a resonant capacitor form a resonant network that ballasts the lamp.

18. The invention according to claim 11 wherein inductor is configured to be used as a low pass filter, to reduce conducted emissions of the input voltage.

19. The invention according to claim 11 wherein the ballast is a self-starting ballast.

20. The invention according to claim 11 wherein the values selected for the diode pair control a duty cycle of the switch.

* * * * *